A. SEARLS.
Whip-Socket.
No. 202,967. Patented April 30, 1878.
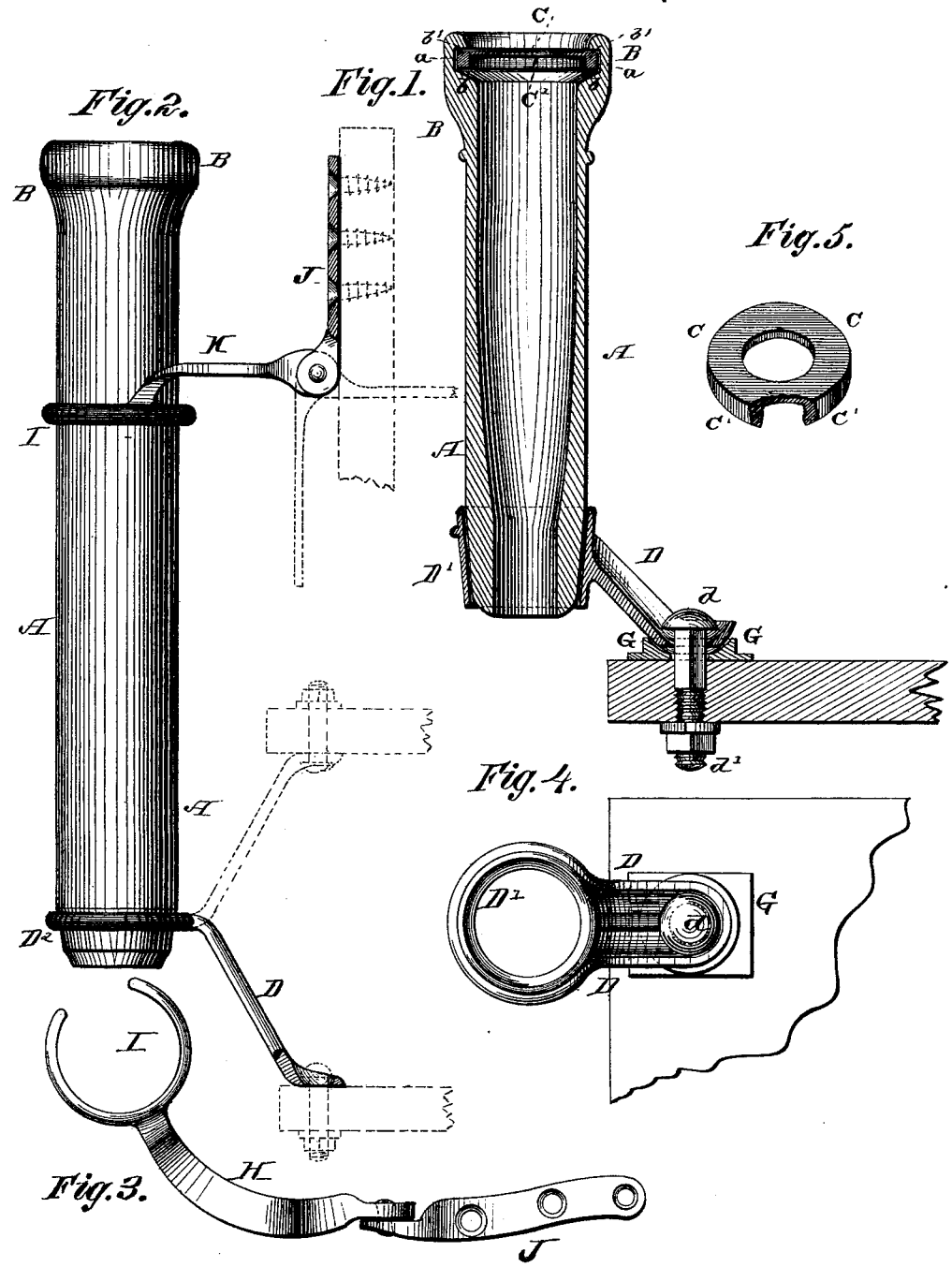

UNITED STATES PATENT OFFICE.

ANSON SEARLS, OF NEWARK, NEW JERSEY.

IMPROVEMENT IN WHIP-SOCKETS.

Specification forming part of Letters Patent No. 202,967, dated April 30, 1878; application filed October 10, 1877.

*To all whom it may concern:*

Be it known that I, ANSON SEARLS, of Newark, in the county of Essex and State of New Jersey, have invented certain new and useful Improvements in Whip-Sockets; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to whip-sockets; and it consists in the construction of the rubber in the top of the socket for holding the whip, and also in the construction of the holder or fastener for the whip-socket, as will be hereinafter more fully set forth.

In the annexed drawings, to which reference is made, and which fully illustrate my invention, Figure 1 is a central vertical section, Fig. 2 is a side elevation, and Figs. 3, 4, and 5 represent detail views, of my invention.

A represents the whip-socket, made of a single piece, with an enlarged or flaring mouth, B. At the base or throat within the mouth B is formed a circumferential inclined shoulder or offset, $b$, and a suitable distance above the same is another circumferential shoulder, $b'$, the under side of which is square, the two shoulders forming between them, as it were, a groove, in which the rubber for holding the whip is inserted. This rubber is made of a flat rubber ring, C, provided with a rim, C', made thick, so as to form a suitable bearing against the shoulders $b\ b'$ when sprung into the groove $a$, while the ring C remains sufficiently flexible to admit of the passage of the whip and hold the same from rattling.

If the ring C and rim C' were made of the same thickness, they would either be too flexible to be held firmly in position between the shoulders $b\ b'$, or, if made stiff enough for that purpose, would have the flexibility destroyed to such a degree that it would be inconvenient to pass the whip-socket through the same.

For holding the whip-socket to the vehicle, I provide an arm, D, with a socket, $D^1$, formed at one end, to receive the lower end of the whip-socket A. The other end of the arm D is rounded on its under side, and has a hole through it for the passage of the bolt $d$.

The rounded end of the arm D rests in a cup, G, made correspondingly concave, and the whole fastened to the vehicle by the bolt $d$ and a nut, $d'$, placed on the end thereof.

It will readily be seen that, the end of the arm D being rounded, it is, so to say, pivoted in the cup G under the head of the bolt, so that it can be adjusted to hold the socket in the desired position, no matter at what point on the vehicle-body the same may be fastened.

It is, of course, evident that the cup G may be dispensed with, and the rounded end of the arm D placed in a concave recess made in the body of the vehicle, in such a manner as to allow of its adjustment in any direction desired, and then fastening the same by means of the bolt and nut.

For sleighs, instead of the socket $D^1$, I have a ring, $D^2$, formed on the end of the arm D, while the other end of the arm is made rounded or convex on its under side the same as described above; but for sleighs, the whip-sockets are generally made longer, and require an additional fastening or holder. For this purpose I use an arm, H, formed at one end with a fork, I, constructed to fit around the whip-socket. The arm H may be curved in any suitable manner, and to its inner end is pivoted a bar or strap, J, which may be fastened to any suitable part of the sleigh-body. In this case the arm D with the ring $D^2$ may be reversed, so as to have said ring up or down, according as the construction of the sleigh-body will permit, and the arm H with its fork I may be adjusted up and down on the whip-socket to suit the position thereof.

Having thus fully described my invention, what I claim as new, and desire to secure by Letters Patent, is—

1. In a whip-socket, the flexible rubber band or ring C, provided with a rubber rim, C', said parts being made separate from any lining of the socket, in combination with the shoulders $b\ b'$, formed in the mouth of the whip-socket, as and for the purposes herein set forth.

2. A holder for whip-sockets consisting of an arm, D, formed with a socket or ring at one end and rounded at the other end, said rounded end being adjustably held by a bolt and nut, substantially as herein set forth.

3. The combination of the socket D¹ with arm D, the cup G, bolt $d$, and nut $d'$, substantially as and for the purposes set forth.

4. The combination of the curved arm H with fork I and the hinged or pivoted strap J, substantially as and for the purposes herein set forth.

In testimony that I claim the foregoing as my own I have hereto affixed my signature in presence of two witnesses.

ANSON SEARLS.

Witnesses:
JOSEPH M. PARCELLS,
WILLIAM ZAIRER.